May 24, 1927.
G. HUEBNER
1,629,872
PLANT DUSTING ATTACHMENT
Filed Jan. 19, 1927
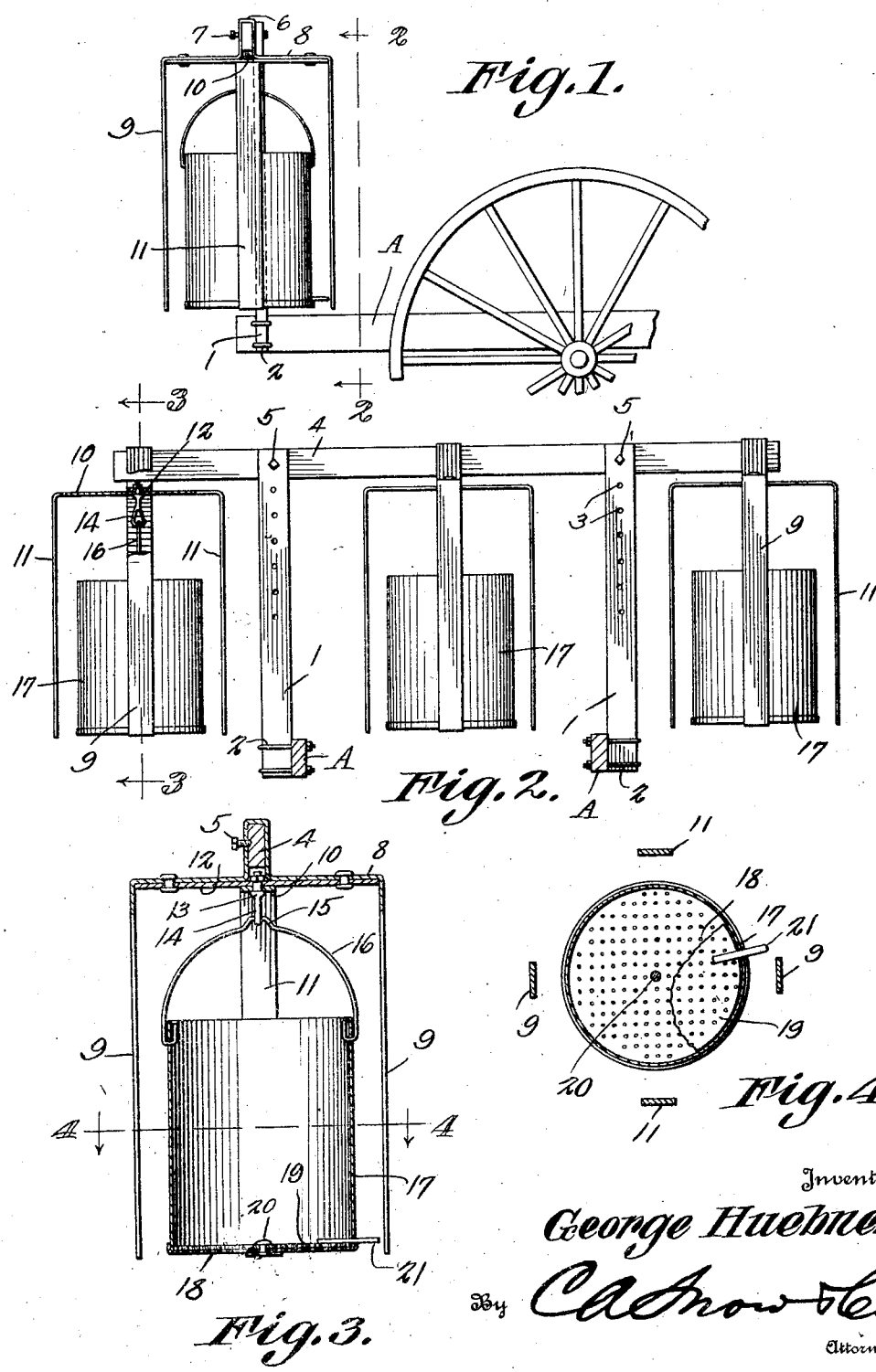
Inventor
George Huebner
By C.A. Snow & Co.
Attorneys Patented May 24, 1927.

1,629,872

UNITED STATES PATENT OFFICE.

GEORGE HUEBNER, OF LAGRANGE, TEXAS.

PLANT-DUSTING ATTACHMENT.

Application filed January 19, 1927. Serial No. 162,108.

This invention relates to a dusting attachment for use in connection with cultivators or other wheel supported structures designed to be drawn over cotton fields or the like, one of the objects being to provide a simple, inexpensive and efficient attachment which, when placed in position on the supporting vehicle, will operate to dust poison over the plants without requiring the use of any special mechanism for insuring proper operation.

A further object is to provide an attachment of this character which can be readily placed in position and has no parts likely to get out of order.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawing the preferred form of the invention has been shown.

In said drawings,

Figure 1 is a side elevation of the rear portion of a cultivator or other vehicle having the present improvements combined therewith.

Figure 2 is a transverse section on line 2—2, Figure 1.

Figure 3 is an enlarged section on line 3—3, Figure 2.

Figure 4 is a section on line 4—4, Figure 3.

Referring to the figures by characters of reference A designates a portion of the frame of a wheel supported cultivator, cart or other vehicle of a type which can be drawn readily over a field containing rows of plants to be treated. The dusting attachment constituting the present invention is adapted to be attached to the rear portion of the frame at a point back of the driver. This attachment includes standards 1 fastened to the sides of frame A by U-bolts 2 or the like. Each standard has a longitudinal series of apertures 3 and connected to the standards is a cross beam 4 of any desired length, this beam being adjustably held to the standards by bolts 5 extending through elected apertures 3. The length of the beam depends upon the number of rows of plants to be treated simultaneously. In the present instance the attachment has been illustrated as suitable for treating three rows at a time. Mounted on the beam 4 at proper distances apart so as to be supported directly over each of the rows are yokes 6 which fit snugly on the beam and are held thereto by set screws 7. Each yoke has oppositely extending arms 8 merging into parallel depending fingers 9. A strip 10 is extended at right angles to the arms 8 directly under the yoke and has parallel depending fingers 11, all of the fingers 9 and 11 being regularly spaced apart as shown particularly in Figure 4. Strip 10 is preferably attached to the arms 8 by providing it with a cross strip 12 extending under and riveted to the arms 8 as shown particularly in Figure 3.

Secured to each strip 12 and 10 directly under the yoke 6 thereabove is a depending stem 13 provided with a snap hook 14. This snap hook is adapted to detachably engage the upwardly offset central portion 15 of the bail 16 of a bucket 17. This bucket has minute apertures 18 in the bottom thereof and the diameter of the bucket is somewhat less than the distance between opposed fingers 9 or 11.

In practice the several buckets are filled with dusting powder for use in the treatment of plants and the vehicle is then moved along the rows of plants to be treated, one of the buckets being suspended above each row. The irregularities in the surface over which the vehicle is travelling will cause the buckets to oscillate in all directions so that they will come violently into contact with the depending fingers. This will result in agitation of the contents of the buckets and the delivery of the dusting powder through the apertures 18 and onto the plants.

The buckets can of course be adjusted toward each other along the beam 4 and upwardly and downwardly by shifting the beam 4 relatively to the standards 1.

Obviously, if desired, the bucket can be supported against movement while the fingers can be mounted to oscillate and strike against the bucket. This reversal of the operation is so obvious that it is not deemed necessary to illustrate the modified construction. Furthermore the bottom of each of the buckets or containers may be provided with any suitable form of regulating valve for controlling the out-flow of the powdered material. This regulating means can be in the form of an apertured disk 19 pivotally connected to the apertured bottom by a rivet 20 or the like and having an operating tongue 21 extending radially therefrom whereby the valve can be rotated, this tongue being mounted to work within a slot in the wall of the container 17.

What is claimed is:

1. A dusting attachment for vehicles including a cross beam, spaced depending fingers supported thereby, and a pendant container supported for oscillation between and against the fingers, said container having an apertured bottom.

2. A dusting attachment for vehicles including a yoke, means for adjustably supporting the yoke upon the vehicle, fingers connected to and depending from the yoke, and a container suspended between the fingers, said container having an apertured bottom and being mounted for oscillation against any of the fingers.

3. A dusting attachment for vehicles including a beam, an adjustable support therefor, a yoke adjustably mounted on the beam, spaced depending fingers supported by the yoke, a container detachably suspended between the fingers and mounted for oscillation in any direction against the fingers, said container having apertures in the bottom thereof.

4. A dusting attachment for vehicles including a supporting structure, a depending member supported thereby, a member in the form of a container supported by said structure, said container having an apertured bottom, one of the said members being mounted for oscillation, thereby to produce agitation of the contents of the container through violent contact of the two members.

5. A dusting attachment for vehicles including a beam, an adjustable support therefor, a yoke adjustably mounted on the beam, spaced depending fingers supported by the yoke, a container detachably suspended between the fingers and mounted for oscillation in any direction against the fingers, said container having apertures in the bottom thereof, and an apertured valve member for controlling the flow of material through the apertured bottom of the container.

In testimony that I claim the foregoing as my own, I have hereto affixed my signature.

GEORGE HUEBNER.